Patented July 23, 1935

2,009,062

UNITED STATES PATENT OFFICE 2,009,062

METHOD FOR MINIMIZING POLYMERIZATION

Kenneth B. Lacy, Highland Park, Ill., assignor to Van Schaack Bros. Chemical Works, Inc., Chicago, Ill., a corporation of Illinois No Drawing. Application April 21, 1933, Serial No. 667,232

16 Claims. (Cl. 260—99.12)

This invention relates to a process for absorbing olefines in sulfuric acid and a method for minimizing the polymerization of the olefines which commonly occurs in connection with such absorption. More particularly, it relates to the treatment of acid solutions of alkyl hydrogen sulfates with a primary alcohol in order to prevent to a considerable extent the formation of polymers which takes place, otherwise, with the passage of time.

When olefines other than ethylene are absorbed in sulfuric acid, for example as a step in the manufacture of secondary alcohols or other products, a portion of the olefines form polymerized products which are insoluble in the liquid menstruum. The proportion of olefines polymerized and the speed with which this occurs will depend on the concentration of the acid, the temperature, the degree of saturation and other factors. But if a sulfuric acid solution of olefines be allowed to stand, even at ordinary room temperatures, the amount of polymers present will increase continuously for a long time. Since more or less delay is frequently unavoidable between processing steps, much loss of desired products results.

I have found that by the suitable limitation of the degree of saturation of the sulfuric acid with the olefines, together with the prompt addition of a primary alcohol to complete the saturation of the acid, polymerization in addition to that which has already occurred during the absorption may be minimized, or even practically inhibited, and the acid liquor may then be stored without substantial loss through additional polymerization, until it can be further processed.

The process will be described as it may be applied in the absorption of the normally liquid fractions of vapor-phase cracked petroleum, though it is not confined to the treatment of olefines so derived. Such fractions consist mainly of the series of olefines from the butenes to the heptenes, with smaller quantities of higher olefines and with some of the lower olefines present as dissolved gases. The pentenes are typical constituents of such olefine mixtures. They may be conceived to react with sulfuric in two steps:

(1) 

(2) 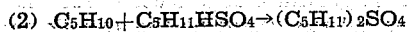

Suitably the mixture of olefines is contacted intimately with dilute sulfuric acid of a concentration of 75% by weight, with such cooling as may be required to maintain a temperature preferably not in excess of about 30° C. When sufficient olefine has been absorbed to complete the reaction of Equation (1), that is, when the sulfuric acid has been wholly or in major part converted to alkyl hydrogen sulfate, contact between the acid liquor (comprising water, unreacted sulfuric acid and alkyl hydrogen sulfate, with possibly small amounts of dialkyl sulfate, suspended polymers, and other substances) and the olefinic material is stopped. An oil layer containing polymers and any unreacted olefines rises to the surface and may be removed. Using the mixture of olefines above described and 75% sulfuric acid, the required degree of saturation will be reached when a sample of acid liquor from which polymers have been allowed to separate by gravity for about a half-hour has a specific gravity in the neighborhood of 1.3.

When the reaction has been carried to the point indicated, the remaining reactivity of the acid is satisfied with ethyl alcohol. The quantity of alcohol added is stoichiometrically proportioned to the remaining combining capacity of the sulfuric acid, substantially one mole of alcohol being used for each mole of alkyl hydrogen sulfate. If the absorption of olefines has been stopped while there is still unreacted sulfuric acid present, two moles of alcohol are required for each mole of such unreacted acid. With experience the amount of alcohol necessary may be determined from the specific gravity of the acid liquor, and this will vary according to the initial concentration of the acid and the particular olefines employed. The amount may also be calculated by the usual methods of chemical computation, after titration of a sample of the acid liquor with standard alkali solution. The alcohol is well mixed with the acid liquor, preferably with cooling to maintain the temperature as before. The treated acid liquor may then be stored until it is convenient to process it further. Acid liquor made and treated as described is useful for the preparation of secondary alcohols upon dilution and distillation by known methods, the ethyl elcohol being separated by fractionation. Or esters or ethers may be made from the acid liquor.

Contact between the sulfuric acid and olefines in the first step of the process may be brought about in any of the ways well known in the art. For example, if the olefine is in the liquid phase, it may be agitated with the acid in a closed vessel. Or the two liquids may be pumped into and through a common pipe. If the olefines are in the gas phase, they may be bubbled through the acid, or the acid may trickle down a filled column through which the gas passes. A bubble-cap tower similar to a fractionating column may be employed if desired.

While the process has been described as applied to olefines in the liquid phase and with sulfuric acid of a definite concentration, other conditions than those described may be employed. Olefines which are gaseous at ordinary temperatures and pressures may be treated, or in the case of olefines normally liquid, the temperature of the absorption may be such as to maintain them in the gaseous state. On the other hand, some olefines which are normally gaseous may be treated in the liquid phase by maintaining the apparatus under suitable pressure. The concentration of sulfuric acid used may be varied, depending in part on the particular olefines being treated and the temperature at which the reaction is carried out. Acid from 65% to 98% is suitable according to the circumstances. The temperature may in some instances be allowed to go higher than 30°, or a maximum lower than this may be desirable. In general, the lower the concentration of the acid within the limits described, the higher the temperature which may safely be employed. Olefines with a smaller number of carbon atoms may be absorbed in more concentrated acid and at a higher temperature than those with a larger number of carbon atoms, though the configuration of the olefine molecule is also a factor.

When ethyl alcohol is used, it may conveniently be in the form of the commercial product which contains about 94% of the alcohol by weight, but the use of alcohol of other concentrations, preferably over 50%, is not precluded. Some of the various forms of denatured ethyl alcohol may be utilized. Other primary alcohols, such as methyl alcohol, n-butyl alcohol, the primary amyl alcohols and the like, or primary alcohols containing an aromatic group may be employed instead of ethyl alcohol; or mixtures of primary alcohols may be used in some circumstances. Liquid alcohols are preferable to solid alcohols, for the purposes of this invention, particularly those which are relatively volatile such as those named. It is also preferable that the alcohol employed contain no double bonds.

The process results in the formation of dialkyl derivatives of sulfuric acid, one of the hydrogen atoms of the acid being replaced by a secondary alkyl group, derived from the olefine or olefines, such as isopropyl, sec-butyl and the like. The other hydrogen atom of the acid is replaced by a primary alkyl group derived from the primary alcohol which was employed. Thus acid liquors which have been treated with one or more primary alcohols in accordance with this invention may comprise such compounds as ethyl sec-amyl sulfate, ethyl isopropyl sulfate, n-butyl sec-butyl sulfate, isoamyl sec-butyl sulfate, and the like, or mixtures thereof, which may be in solution in excess sulfuric acid and water. Such compounds have the general formula

where R represents the radical of a primary alcohol, and R₁ and R₂ represent alkyl groups. They usually cannot be distilled without decomposition. They are heavier than water but upon treatment therewith, particularly at elevated temperatures, are decomposed either into the corresponding primary and secondary alcohols; or, by adjusting acid concentrations and temperatures, primary, secondary and/or mixed ethers are formed.

What I claim is:

1. A process which comprises reacting sulfuric acid partially with an olefine higher than ethylene, and thereafter adding a primary alcohol in an amount sufficient to satisfy the remaining reactivity of the sulfuric acid.

2. A process which comprises reacting sulfuric acid partially with a normally liquid olefine, and thereafter adding a primary alcohol in an amount sufficient to satisfy the remaining reactivity of the sulfuric acid.

3. A process which comprises reacting sulfuric acid partially with a hydrocarbon mixture comprising in substantial amount the series of olefines from butenes to heptenes, and thereafter adding a primary alcohol in an amount sufficient to satisfy the remaining reactivity of the sulfuric acid.

4. A process which comprises reacting sulfuric acid partially with an olefine higher than ethylene, and thereafter adding ethyl alcohol in an amount sufficient to satisfy the remaining reactivity of the sulfuric acid.

5. A process which comprises reacting sulfuric acid partially with a normally liquid olefine, and thereafter adding ethyl alcohol in an amount sufficient to satisfy the remaining reactivity of the sulfuric acid.

6. A process which comprises reacting sulfuric acid partially with a hydrocarbon mixture comprising in substantial amount the series of olefines from butenes to heptenes, and thereafter adding ethyl alcohol in an amount sufficient to satisfy the remaining reactivity of the sulfuric acid.

7. A process which comprises contacting sulfuric acid with an olefine higher than ethylene whereby alkyl hydrogen sulfate is formed, discontinuing the contacting at a predetermined concentration of said alkyl hydrogen sulfate, before any substantial amount of dialkyl sulfate is formed, and relatively soon thereafter adding sufficient ethyl alcohol to the mixture to satisfy stoichiometrically the remaining combining capacity of the sulfuric acid.

8. A process which comprises contacting sulfuric acid with successive portions of olefine higher than ethylene, said portions optionally having been first contacted with other portions of sulfuric acid, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of ethyl alcohol to the acid liquor to satisfy stoichiometrically the remaining combining capacity of the sulfuric acid.

9. A process which comprises contacting sulfuric acid with successive portions of olefine higher than ethylene, said portions optionally having been first contacted with other portions of sulfuric acid countercurrently, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of ethyl alcohol to the acid liquor to satisfy stoichiometrically the remaining combining capacity of the sulfuric acid.

10. A process which comprises contacting sulfuric acid with successive portions of olefine higher than ethylene, said portions optionally having been first contacted with other portions of sulfuric acid, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of a primary alcohol to the acid liquor to satisfy stoichiometrically the remaining combining capacity of the sulfuric acid.

11. A process which comprises contacting sulfuric acid with successive portions of olefine higher than ethylene, said portions optionally having been first contacted with other portions of sulfuric acid, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of a liquid primary alcohol to the acid liquor to satisfy stoichiometrically the remaining combining capacity of the sulfuric acid.

12. A process which comprises contacting sulfuric acid of not substantially lower concentration than 75% with an olefine higher than ethylene whereby alkyl hydrogen sulfate is formed, discontinuing the contacting at a predetermined concentration of said alkyl hydrogen sulfate, before any substantial amount of dialkyl sulfate is formed, and relatively soon thereafter adding sufficient ethyl alcohol to the mixture to satisfy stoichiometrically the remaining combining capacity of the sulfuric acid.

13. A process which comprises contacting sulfuric acid of not substantially lower concentration than 75% with successive portions of olefine higher than ethylene, said portions optionally having been first contacted with other portions of sulfuric acid, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of ethyl alcohol to the acid liquor to satisfy stoichiometrically the remaining combining capacity of the sulfuric acid.

14. A process which comprises contacting sulfuric acid of not substantially lower concentration than 75% with successive portions of olefine higher than ethylene, said portions optionally having been first contacted with other portions of sulfuric acid, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of a primary alcohol to the acid liquor to satisfy stoichiometrically the remaining combining capacity of the sulfuric acid.

15. A process which comprises contacting sulfuric acid with an olefine higher than ethylene in liquid phase whereby alkyl hydrogen sulfate is formed, discontinuing the contacting at a predetermined concentration of said alkyl hydrogen sulfate, before any substantial amount of dialkyl sulfate is formed, and relatively soon thereafter adding sufficient ethyl alcohol to the mixture to satisfy stoichiometrically the remaining combining capacity of the sulfuric acid.

16. A process which comprises contacting sulfuric acid with successive portions of olefine higher than ethylene in liquid phase, said portions optionally having been first contacted with other portions of sulfuric acid, whereby a part at least of said sulfuric acid is converted into alkyl hydrogen sulfate, removing the acid liquor from further contact with olefine at such a concentration of alkyl hydrogen sulfate that substantially no dialkyl sulfate is formed, and relatively soon thereafter adding a sufficient amount of a primary alcohol to the acid liquor to satisfy stoichiometrically the remaining combining capacity of the sulfuric acid.

KENNETH B. LACY.